United States Patent
Beck et al.

(10) Patent No.: US 8,992,373 B2
(45) Date of Patent: Mar. 31, 2015

(54) MULTI-STAGE PLANETARY VEHICLE TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/379,809

(22) PCT Filed: Jan. 10, 2013

(86) PCT No.: PCT/EP2013/050357
§ 371 (c)(1),
(2) Date: Aug. 20, 2014

(87) PCT Pub. No.: WO2013/127548
PCT Pub. Date: Sep. 6, 2013

(65) Prior Publication Data
US 2015/0045174 A1    Feb. 12, 2015

(30) Foreign Application Priority Data
Feb. 29, 2012 (DE) .......................... 10 2012 203 069

(51) Int. Cl.
*F16H 3/62* (2006.01)
(52) U.S. Cl.
CPC .......... *F16H 3/62* (2013.01); *F16H 2200/0065* (2013.01); *F16H 2200/2012* (2013.01); *F16H 2200/2046* (2013.01)
USPC ............................ 475/278; 475/271; 475/277
(58) Field of Classification Search
USPC .......................................... 475/271, 277, 278
See application file for complete search history.

(56) References Cited

U.S. PATENT DOCUMENTS

| 6,176,803 | B1 * | 1/2001 | Meyer et al. | 475/286 |
| 6,991,578 | B2 * | 1/2006 | Ziemer | 475/296 |

(Continued)

FOREIGN PATENT DOCUMENTS

| DE | 10 2007 055 808 A1 | 6/2009 |
| DE | 10 2009 019 046 A1 | 11/2010 |

(Continued)

OTHER PUBLICATIONS

German Search Report Corresponding to 10 2012 203 068.9 mailed Nov. 13, 2012 6 pages.

(Continued)

*Primary Examiner* — Derek D Knight
(74) *Attorney, Agent, or Firm* — Davis & Bujold, PLLC; Michael J. Bujold (57) ABSTRACT

A multi-gear transmission of a vehicle having a housing in which four planetary gearsets and a plurality of shafts and shifting elements are arranged. The drive input shaft can couple the sun gears of gearsets (RS1, RS3) and the carrier of gearset (RS1) and can be connected indirectly to the carrier of gearset (RS2). The drive output shaft couples the ring gear of gearset (RS4) and is connected directly or can be indirectly connected to the carrier of gearset (RS3), the sun gear and carrier of gearset (RS1) and the sun gear of gearset (RS4) can be connected to the housing. The ring gear of gearset (RS1) couples the carrier of gearset (RS4) and can be or is connected to the sun gear of gearset (RS2), and the ring gear of gearset (RS2) and the ring gear of gearset (RS3) are, or can be, connected to one another.

17 Claims, 3 Drawing Sheets

(56) References Cited

U.S. PATENT DOCUMENTS

| | | |
|---|---|---|
| 7,771,305 B1 | 8/2010 | Hart et al. |
| 7,887,453 B2 | 2/2011 | Phillips et al. |
| 8,038,565 B2 * | 10/2011 | Phillips et al. ............... 475/276 |
| 8,663,055 B2 | 3/2014 | Brehmer et al. |
| 2009/0118062 A1 | 5/2009 | Phillips et al. |
| 2009/0209389 A1 | 8/2009 | Phillips et al. |
| 2013/0029799 A1 * | 1/2013 | Park et al. .................... 475/276 |

FOREIGN PATENT DOCUMENTS

| | | |
|---|---|---|
| DE | 10 2009 047 277 A1 | 6/2011 |
| JP | 2009-197927 A | 9/2009 |

OTHER PUBLICATIONS

German Search Report Corresponding to 10 2012 203 069.7 mailed Nov. 13, 2012 6 pages.
German Search Report Corresponding to 10 2012 203 104.9 mailed Nov. 13, 2012 6 pages.
International Search Report Corresponding to PCT/EP2013/050356 mailed Mar. 18, 2013 5 pages.
International Search Report Corresponding to PCT/EP2013/050357 mailed Mar. 18, 2013 5 pages.
International Search Report Corresponding to PCT/EP2013/050361 mailed Mar. 18, 2013 5 pages.
Written Opinion Corresponding to PCT/EP2013/050361 mailed Mar. 18, 2013 13 pages.

* cited by examiner

| GEAR | ENGAGED SHIFT ELEMENTS | | | | | | TRANS. RATIO | GEAR STEP |
|---|---|---|---|---|---|---|---|---|
| | BRAKE | | | CLUTCH | | | | |
| | E | D | F | B | C | A | i | φ |
| G1 | × | | | | × | × | 5,391 | |
| G2 | × | × | | | | × | 3,388 | 1,591 |
| G3 | × | | × | | | × | 2,276 | 1,488 |
| G4 | | × | × | | | × | 1,685 | 1,351 |
| G5 | | | × | | × | × | 1,407 | 1,198 |
| G6 | | | × | × | | × | 1,162 | 1,210 |
| G7 | | | | × | × | × | 1,000 | 1,162 |
| G8 | | | × | × | × | | 0,778 | 1,286 |
| G9 | | × | × | × | | | 0,617 | 1,260 |
| R | × | | × | | × | | −2,994 | TOTAL 8,733 |
| Z | | × | | × | × | × | 0,901 | |

Fig. 6

MULTI-STAGE PLANETARY VEHICLE TRANSMISSION

This application is a National Stage completion of PCT/EP2013/050357 filed Jan. 10, 2013, which claims priority from German patent application serial no. 10 2012 203 069.7 filed Feb. 29, 2012.

FIELD OF THE INVENTION

The present invention concerns a multi-gear transmission of planetary design for a vehicle.

BACKGROUND OF THE INVENTION

From the document U.S. Pat. No. 7,887,453 B2 a multi-gear planetary transmission for a vehicle is known. The multi-gear transmission comprises four planetary gearsets and six shifting elements, so that nine forward gears and one reverse gear are produced. From the shifting scheme of the known multi-gear transmission it is apparent that to obtain each gear, in each case only two of the shifting elements are closed. Thus, owing to the open disk shifting elements undesired drag losses occur.

Furthermore, it is known to be advantageous for shifting elements to be easily accessible, for example positioned externally, so that the hydraulic and/or mechanical and/or electric actuation leads can be arranged more simply and/or give rise to lower losses.

SUMMARY OF THE INVENTION

Consequently, the purpose of the present invention is to propose a multi-gear transmission of the type described to begin with, which has better efficiency and little structural complexity and whose shifting elements are arranged optimally as regards their actuation.

According to the invention this objective is achieved by virtue of the characteristics specified in the description and the drawings.

According to these, a multi-stage transmission of planetary design or a multi-gear planetary transmission for a vehicle is proposed, which has a housing in which four planetary gearsets or four planetary gearset wheel planes and preferably eight rotating shafts as well as six shifting elements are accommodated. By actuating the shifting elements a plurality of gears can be obtained.

In that the first shaft is the drive input or drive input shaft and is or can be connected respectively to the sun gear of the first and third planetary gearsets and respectively to the planetary carriers of the first and second planetary gearsets and also to the housing, the second shaft is the drive output or drive output shaft and is or can be connected to the ring gear of the fourth planetary gearset and to the planetary carrier of the third planetary gearset, the ring gear of the first planetary gearset is or can be connected to the sun gear of the second planetary gearset and to the planetary carrier of the fourth planetary gearset, the ring gear supports of the second and third planetary gearsets are or can be connected, and the sun gear of the fourth planetary gearset can be connected to the housing, a multi-gear transmission according to the invention is obtained which preferably enables actuation of the shifting elements in an efficiency-improving manner because the shifting elements are easily accessible from the outside. Moreover, due to the connections chosen according to the invention between the elements of the transmission, an optimized series of transmission ratios and low absolute and relative rotation speeds as well as low planetary gearset and shifting element torques are obtained in the multi-gear transmission proposed. Furthermore, thanks to the arrangement of the gearsets gearing efficiencies are improved and components loads are low while there is little structural complexity, so the production costs and the weight of the multi-gear transmission are advantageously reduced.

In this context 'connected' is understood to mean that the connected elements are connected to one another directly, by just one shaft.

'Can be connected' means in particular that the elements which can be connected to one another are so connected by a shaft that can be interrupted by at least one shifting element.

The good accessibility of the shifting elements is achieved, among other things, on the one hand by using brakes as shifting elements and on the other hand with clutches as shifting elements, which are positioned on external shafts, preferably on the drive input and the drive output in the multi-gear transmission according to the invention.

As viewed in the axial direction the planetary gearsets can be arranged in the sequence first planetary gearset, second planetary gearset, third planetary gearset and fourth planetary gearset, wherein the first, third and fourth planetary gearsets are each preferably minus planetary gearsets while the second planetary gearset is preferably a plus planetary gearset. However, at points where the connections so permit, one or more of the minus planetary gearsets can be changed to plus planetary gearsets if at the same time the carrier and ring gear connections are exchanged and the fixed transmission ratio is increased by the value 1, or conversely, the plus planetary gearset can be changed to a minus planetary gearset. As is known, a minus planetary gearset has planetary gearwheels mounted to rotate on its planetary carrier, which mesh with the sun gear and the ring gear so that when the when the planetary carrier is held fixed and the sun gear is rotating, the ring gear rotates in the direction opposite to that of the sun gear. As is also known, a plus planetary gearset has mounted to rotate on its planetary carrier inner and outer planetary gearwheels which mesh with one another, the sun gear of the planetary gearset meshing with the inner planetary gearwheels and the ring gear meshing with the outer planetary gearwheels, so that when the planetary carrier is held fixed and the sun gear is rotating, the ring gear rotates in the same direction as the sun gear.

While leaving the connections of the individual elements unchanged, the planetary gearsets can also be arranged in a different sequence.

In advantageous embodiment variants of the present invention it can preferably be provided that various arrangement positions are possible for the first shifting element, which represent functionally equivalent gear configuration alternatives. Thus, essentially instead of a detachable connection between the drive input shaft and the sun gear of the third planetary gearset a permanent connection can be provided, whereas the detachable connection is formed at some other predetermined position between transmission elements in the multi-gear transmission. For example, the detachable connection can be provided between the planetary carrier of the third planetary gearset and the ring gear of the fourth planetary gearset or the drive output shaft. It is also conceivable for the detachable connection to be arranged between the ring gears of the second and third planetary gearsets. Possibly also, the detachable connection is between the planetary carriers of the first and second planetary gearsets or the drive input shaft. Finally, it is also conceivable for the detachable connection to be arranged between on the one hand the ring gear of the first planetary gearset and the planetary carrier of the fourth planetary gearset and on the other hand the sun gear of the second planetary gearset.

The term shifting element is understood to mean a shiftable connection between two elements of the transmission such that the torque to be transmitted between the two elements is transferred by force or friction locking or by shape interlock. If both elements of the shiftable connection are designed to rotate the shifting element is called a clutch, whereas if only one of the two elements of the shiftable connection rotates, the shifting element is called a brake. Moreover, the geometrical position or sequence of the individual shifting elements can also be chosen freely provided that it allows appropriate connections between the elements. In this way the position of individual elements can be displaced as desired. Example embodiments of frictional shifting elements are disk clutches or disk brakes, band brakes, conical clutches or brakes, electromagnetic clutches, magnetic particle clutches or electrorheological clutches. Example embodiments of interlocking shifting elements are claw clutches or brakes and tooth clutches.

Preferably, by virtue of their nature above all the first shifting element and the fifth shifting element can be in the form of interlocking shifting elements, which brings clear fuel consumption advantages.

Owing to the coaxial arrangement of the drive input and the drive output, the multi-gear transmission proposed according to the invention can be used to produce a standard drive configuration in a vehicle. However, a front-transverse configuration can also be produced with the planetary transmission in a vehicle if the geometrical arrangement and hence the sequence of the elements of the planetary transmission, such as the arrangement of the individual planetary gearsets and shifting elements, is changed so long as the connections between transmission elements so permits, and then for example the drive input and the drive output will be arranged offset from one another.

As the starting element, in the multi-gear transmission according to the invention a hydrodynamic torque converter or a hydrodynamic clutch can be used. It is also conceivable to use an additional starting clutch or even an integrated starting clutch. Furthermore, an electric machine or some other force/power source can be arranged on at least one of the shafts. Moreover, on at least one of the shafts a freewheel to the housing or to another shaft can be arranged.

BRIEF DESCRIPTION OF THE DRAWINGS

Below, the present invention is explained further with reference to the drawing, which shows.

DETAILED DESCRIPTION OF THE PREFERRED EMBODIMENTS

The figures show various example embodiment variants of a multi-gear transmission of planetary design, for example used as an automatic or automated transmission in a vehicle.

Regardless of the embodiment variant concerned, the multi-gear transmission comprises a housing 9 with four planetary gearsets RS1, RS2, RS3, RS4 and with six shifting elements A, B, C, D, E, F as well as eight rotating shafts 1, 2, 3, 4, 5, 6, 7, 8, 8A, 8B, 8C, 8D, the term shaft being understood to mean one or more components of any design form, which connect or couple at least two elements of the multi-gear transmission. In the proposed multi-gear transmission there are housing couplings formed by brakes, so the no permanent housing couplings are present.

As planetary gearsets, for example minus planetary gearsets and one plus planetary gearset are used, such that in the embodiment variant shown the first, third and fourth planetary gearsets are each minus planetary gearsets whereas the second planetary gearset is a plus planetary gearset. Furthermore, the first, second and third shifting elements A, B, C are in each case clutches and the fourth, fifth and sixth shifting elements D, E, F are each brakes. In this case for example, disk brakes and disk clutches are shown, But preferably the first shifting element A and the fifth shifting element E are in the form of claw shifting elements so as to save fuel.

According to the invention, in the multi-gear transmission it is provided that the first shaft 1 is the drive input An and is connected directly or indirectly to the sun gear SO3 of the third planetary gearset RS3. This means that the first shaft 1 is either connected to the sun gear SO3 directly, i.e. without any other, intermediate elements, or that the first shaft 1 is connected detachably to the sun gear SO3 indirectly, i.e. for example by way of the first shifting element A and another shaft 8. The first shaft 1 can be connected, in each case indirectly, to the sun gear SO1 of the first planetary gearset RS1 and to the planetary carrier PT1 of the first planetary gearset RS1 and also to the planetary carrier PT2 of the second planetary gearset RS2. The second shaft 2 is the drive output Ab and is connected directly to the ring gear HO4 of the fourth planetary gearset RS4. This means that the second shaft 2 is connected without intermediate elements, i.e. directly, to the ring gear HO4. Furthermore, the second shaft 2 is connected directly or can be connected indirectly to the planetary carrier PT3 of the third planetary gearset RS3. This means that the second shaft 2 is either connected to the planetary carrier PT3 directly, i.e. without any other, intermediate elements, or that the second shaft 2 is connected detachably to the planetary carrier PT3 indirectly, i.e. for example by way of the first shifting element A and another shaft 8A. Moreover, the sun gear SO1 and the planetary carrier PT1 of the first planetary gearset RS1 and the sun gear SO4 of the fourth planetary gearset RS4 can in each case be connected to the housing 9. In addition the ring gear HO1 of the first planetary gearset RS1 is connected to the planetary carrier PT4 of the fourth planetary gearset RS4 and is or can be connected to the sun gear SO2 of the second planetary gearset RS2. Finally, the ring gear HO2 of the second planetary gearset RS2 and the ring gear HO3 of the third planetary gearset RS3 are or can be connected to one another.

From the connection options described, four functionally equivalent arrangement positions of the first shifting element A are obtained. The alternative arrangement positions are shown in five different embodiment variants of the multi-gear transmission, according to FIGS. 1 to 5.

Figure 1:
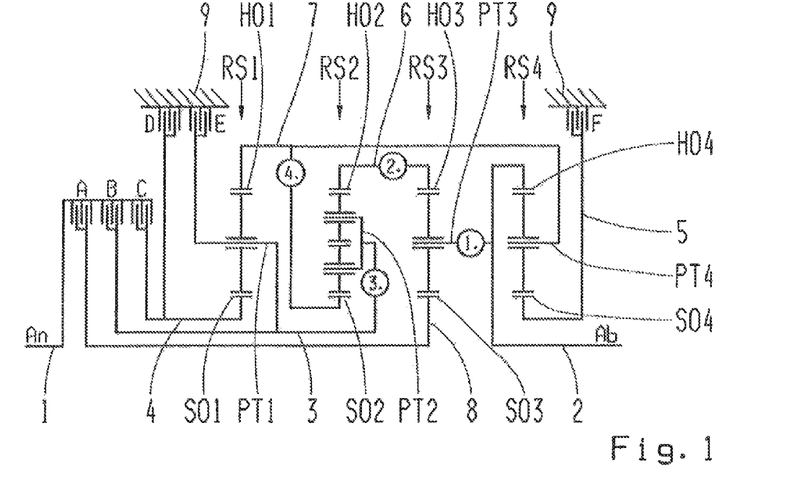
FIG. 1: A schematic view of a first embodiment variant of a multi-gear transmission according to the invention, with four alternative arrangement positions of a first shifting element.

FIG. 1 shows a first embodiment variant, in which the four other arrangement positions of the first shifting element A are indicated as 1. (corresponding to the second embodiment variant shown in FIG. 2), 2. (corresponding to the third embodiment variant in FIG. 3), 3. (corresponding to the fourth embodiment variant shown in FIG. 4) and 4. (corresponding to the fifth embodiment variant shown in FIG. 5).

In the first gear configuration according to the first embodiment variant of the multi-gear transmission shown in FIG. 1, it is provided that the first shaft 1 can be connected by the first shifting element A in the form of a clutch and by way of the eighth shaft 8 to the sun gear SO3 of the third planetary gearset RS3, which means that the first shaft 1 is detachably connected to the sun gear SO3. Furthermore, the first shaft 1 can be connected or is detachably connected by the second shifting element B in the form of a clutch and by way of the third shaft 3 to the planetary carrier PT1 of the first planetary gearset RS1 and to the planetary carrier PT2 of the second planetary gearset RS2, whereas the planetary carrier PT1 of the first planetary gearset RS1 is detachably connected to the housing 9 by way of the third shaft 3 and by the fifth shifting element E in the form of a brake. In addition, the first shaft 1 is detachably connected to the sun gear SO1 of the first planetary gearset RS1 by the third shifting element C in the form of a clutch and by way of the fourth shaft 4, whereas the sun gear SO1 of the first planetary gearset RS1 is detachably connected to the housing 9 by way of the fourth shaft 4 and by the fourth shifting element D in the form of a brake. The second shaft 2 is connected to the ring gear HO4 of the fourth planetary gearset RS4 and to the planetary carrier PT3 of the third planetary gearset RS3. The ring gear HO1 of the first planetary gearset RS1 is connected by the seventh shaft 7 to the sun gear SO2 of the second planetary gearset RS2 and to the planetary carrier PT4 of the fourth planetary gearset RS4. The ring gear HO2 of the second planetary gearset RS2 is connected by way of the sixth shaft 6 to the ring gear HO3 of the third planetary gearset RS3. The sun gear SO4 of the fourth planetary gearset RS4 is detachably connected by way of the fifth shaft 5 and by the sixth shifting element F in the form of a brake, to the housing.

Figure 2:
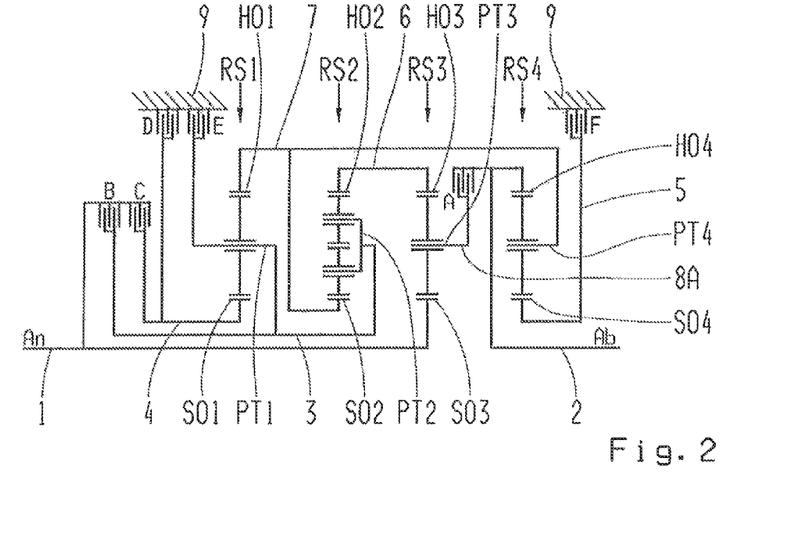
FIG. 2: A schematic view of a second embodiment variant of the multi-gear transmission.

In the gear configuration shown in FIG. 2 according to the second embodiment variant of the multi-gear transmission, it is provided that the first shaft 1 is connected to the sun gear SO3 of the third planetary gearset RS3. Moreover, the first shaft 1 is connected or can be detachably connected to the planetary carrier PT1 of the first planetary gearset RS1 and to the planetary carrier PT2 of the second planetary gearset RS2 by the second shifting element B in the form of a clutch and by way of the third shaft 3, whereas the planetary carrier PT1 of the first planetary gearset RS1 is detachably connected by way of the third shaft 3 and by the fifth shifting element E in the form of a brake to the housing 9. Furthermore, the first shaft 1 is detachably connected by the third shifting element C in the form of a clutch and by way of the fourth shaft 4 to the sun gear SO1 of the first planetary gearset RS1, whereas the sun gear SO1 of the first planetary gearset RS1 is detachably connected by way of the fourth shaft 4 and by the fourth shifting element D in the form of a brake to the housing 9. The second shaft 2 is connected to the ring gear HO4 of the fourth planetary gearset RS4. Moreover, the second shaft 2 is detachably connected by the first shifting element A in the form of a clutch and by way of the shaft 8A to the planetary carrier PT3 of the third planetary gearset RS3. The ring gear HO1 of the first planetary gearset RS1 is connected by the seventh shaft 7 to the sun gear SO2 of the second planetary gearset RS2 and to the planetary carrier PT4 of the fourth planetary gearset RS4. The ring gear HO2 of the second planetary gearset RS2 is connected by the sixth shaft 6 to the ring gear HO3 of the third planetary gearset RS3. The sun gear SO4 of the fourth planetary gearset RS4 is detachably connected by the fifth shaft 5 and by the sixth shifting element F in the form of a brake to the housing.

Figure 3:
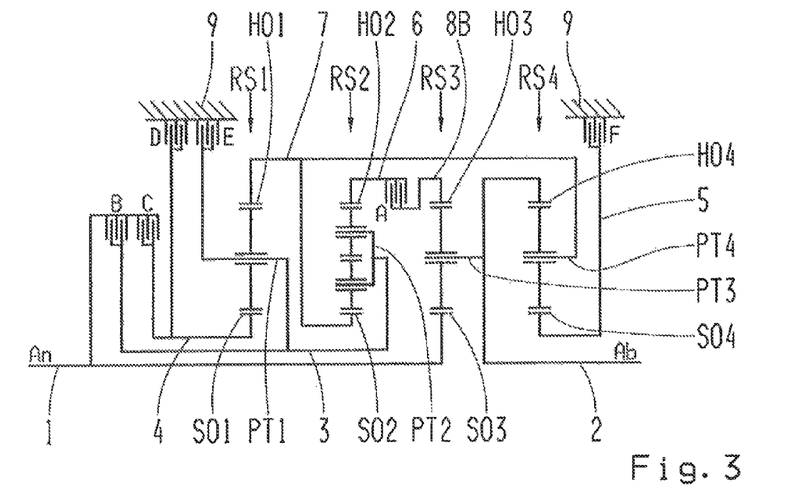
FIG. 3: A schematic view of a third embodiment variant of the multi-gear transmission.

In the gear configuration shown in FIG. 3 according to the third embodiment variant of the multi-gear transmission, it is provided that the first shaft 1 is connected to the sun gear SO3 of the third planetary gearset RS3. Moreover, the first shaft 1 is detachably connected by the second shifting element B in the form of a clutch and by way of the third shaft 3 to the planetary carrier PT1 of the first planetary gearset RS1 and to the planetary carrier PT2 of the second gearset RS2, whereas the planetary carrier PT1 of the first planetary gearset RS1 is detachably connected by way of the third shaft 3 and by the fifth shifting element E in the form of a brake to the housing 9. Furthermore, the first shaft 1 is detachably connected by the third shifting element C in the form of a clutch and by way of the fourth shaft 4 to the sun gear SO1 of the first planetary gearset RS1, whereas the sun gear SO1 of the first planetary gearset RS1 is detachably connected by way of the fourth shaft 4 and by the fourth shifting element D in the form of a brake to the housing 9. The second shaft 2 is connected to the ring gear HO4 of the fourth planetary gearset RS4 and to the planetary carrier PT3 of the third planetary gearset RS3. The ring gear HO1 of the first planetary gearset RS1 is connected by the seventh shaft 7 to the sun gear SO2 of the second planetary gearset RS2 and to the planetary carrier PT4 of the fourth planetary gearset RS4. The ring gear HO2 of the second planetary gearset RS2 is detachably connected by the sixth shaft 6 and by the first shifting element A in the form of a clutch, and also by way of the eighth shaft 8B, to the ring gear HO3 of the third planetary gearset RS3. The sun gear SO4 of the fourth planetary gearset RS4 is detachably connected by the fifth shaft 5 and by the sixth shifting element F in the form of a brake to the housing 9.

Figure 4:
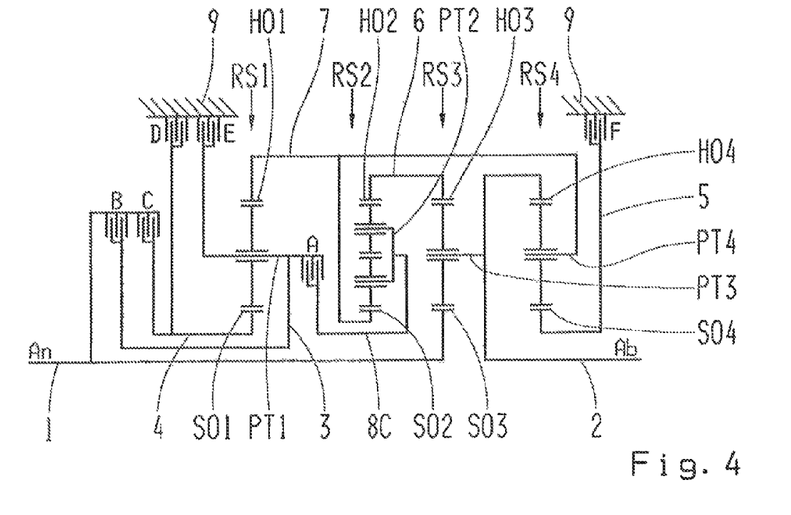
FIG. 4: A schematic view of a fourth embodiment variant of the multi-gear transmission.

In the gear configuration shown in FIG. 4 according to the fourth embodiment variant of the multi-gear transmission, it is provided that the first shaft 1 is connected to the sun gear SO3 of the third planetary gearset RS3. Moreover, the first shaft 1 is detachably connected by the second shifting element B in the form of a clutch and by way of the third shaft 3 to the planetary carrier PT1 of the first planetary gearset RS1, whereas the planetary carrier PT1 of the first planetary gearset RS1 is detachably connected by the third shaft and by the fifth shifting element E in the form of a brake to the housing 9. The planetary carrier PT2 of the second planetary gearset RS2 is detachably connected by the third shaft 3 and by the first shifting element A in the form of a clutch, as well as by way of the eighth shaft 8C, to the first shaft 1 and to the planetary carrier PT1 of the first planetary gearset RS1. Furthermore, the first shaft 1 is detachably connected by the third shifting element C in the form of a clutch and by way of the fourth shaft 4 to the sun gear SO1 of the first planetary gearset RS1, whereas the sun gear SO1 of the first planetary gearset RS1 is detachably connected by way of the fourth shaft 4 and by fourth shifting element D in the form of a brake to the housing 9. The second shaft 2 is connected to the ring gear HO4 of the fourth planetary gearset RS4 and to the planetary carrier PT3 of the third planetary gearset RS3. The ring gear HO1 of the first planetary gearset RS1 is connected by the seventh shaft 7 to the sun gear SO2 of the second planetary gearset RS2 and to the planetary carrier PT4 of the fourth planetary gearset RS4. The ring gear HO2 of the second planetary gearset RS2 is connected by the sixth shaft 6 to the ring gear HO3 of the third planetary gearset RS3. The sun gear SO4 of the fourth planetary gearset RS4 is detachably connected by the fifth shaft 5 and by the sixth shifting element F in the form of a brake to the housing 9.

Figure 5:
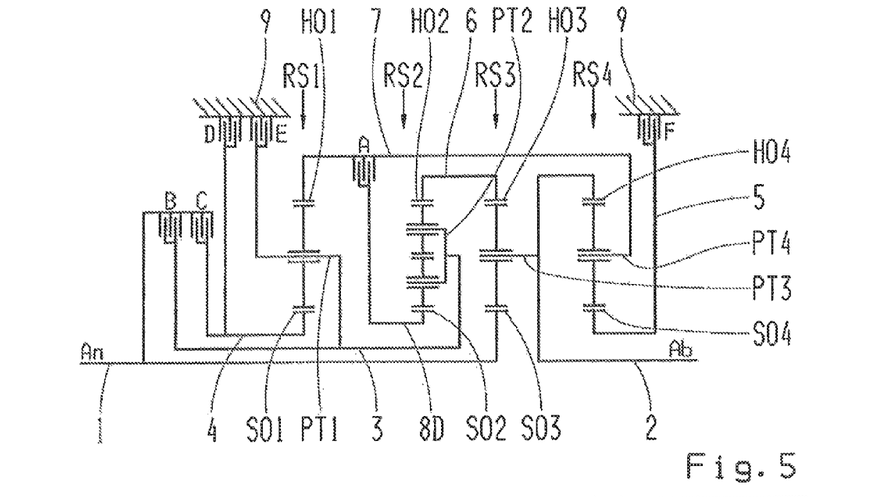
FIG. 5: A schematic view of a fifth embodiment variant of the multi-gear transmission.

In the gear configuration shown in FIG. 5 according to the fifth embodiment variant of the multi-gear transmission, it is provided that the first shaft 1 is connected to the sun gear SO3 of the third planetary gearset RS3. Moreover, the first shaft 1 is detachably connected by the second shifting element B in the form of a clutch and by the third shaft 3 to the planetary carrier PT1 of the first planetary gearset RS1 and to the planetary carrier PT2 of the second planetary gearset RS2, whereas the planetary carrier PT1 of the first planetary gearset RS1 is detachably connected by the third shaft 3 and by the fifth shifting element E in the form of a brake to the housing 9. The first shaft 1 is also detachably connected by the third shifting element C in the form of a clutch and by way of the fourth shaft 4 to the sun gear SO1 of the first planetary gearset RS1, whereas the sun gear SO1 of the first planetary gearset RS1 is detachably connected by the fourth shaft 4 and by the fourth shifting element D in the form of a brake to the housing 9. The second shaft 2 is connected to the ring gear HO4 of the fourth planetary gearset RS4 and to the planetary carrier PT3 of the third planetary gearset RS. The ring gear Ha1 of the first planetary gearset RS1 is connected by the seventh shaft 7 to the planetary carrier PT4 of the fourth planetary gearset RS4. The ring gear HO1 of the first planetary gearset RS1 and the planetary carrier PT4 of the fourth planetary gearset RS4 are detachably connected by the first shifting element A in the form of a clutch and by the eighth shaft 8D to the sun gear SO2 of the second planetary gearset RS2. The ring gear HO2 of the second planetary gearset RS2 is connected by the sixth shaft 6 to the ring gear HO3 of the third planetary gearset RS3. The sun gear SO4 of the fourth planetary gearset RS4 is detachably connected by way of the fifth shaft 5 and by the sixth shifting element F in the form of a brake to the housing 9.

Figure 6:
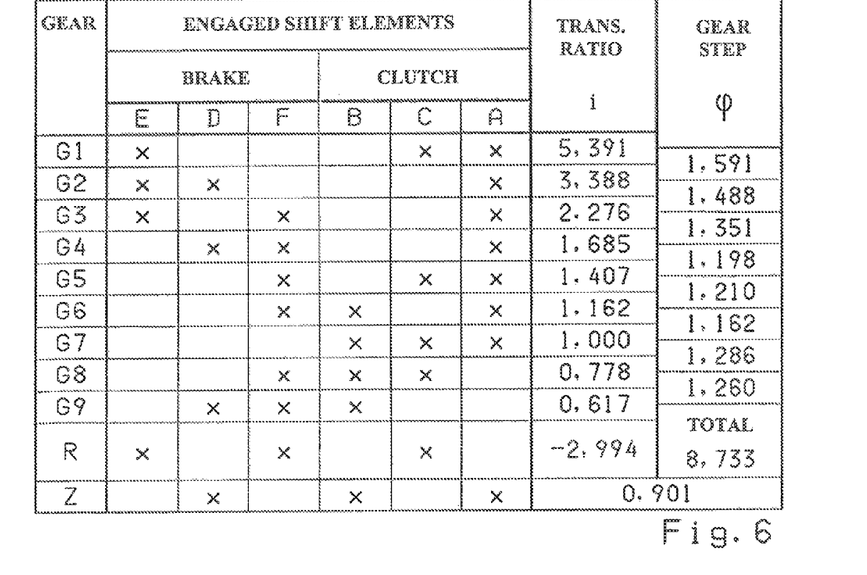
FIG. 6: A shifting scheme for the various embodiment variants of the multi-gear transmission.

FIG. 6 shows a shifting scheme applicable to the functionally equivalent gear configurations shown in FIGS. 1 to 5. The shifting scheme shows as a table the shifting elements A, B, C, D, E, F to be closed or actuated in order to obtain the various gears, and for each gear a transmission ratio i and the respective gear intervals φ between the various gears. Besides the nine forward gears G1, G2, G3, G4, G5, G6, G7 G8, G9 and the one reverse gear R indicated, a further, additional shifting combination Z is shown as another possible gear. As preferred fixed transmission ratios, for the first planetary gearset RS1 a value of around $i_0=-3.850$ can be used, for the second planetary gearset RS2 a value of around $i_0=1.670$, for the third planetary gearset RS3 a value of approximately $i_0=-2.388$ and for the fourth planetary gearset RS4 a value of approximately $i_0=-3.498$. Moreover, it is apparent from the shifting scheme that to engage a gear in each case three of the shifting elements are closed. To carry out a gearshift, only two shifting elements have to be shifted at the same time.

To be specific, the shifting scheme in FIG. 6 shows that to obtain the first forward gear G1 the first shifting element A, the third shifting element C and the fifth shifting element E are closed. To obtain the second forward gear G2 the first shifting element A, the fourth shifting element D and the fifth shifting element E are closed. In the third forward gear G3 the first shifting element A, the fifth shifting element E and the sixth shifting element F are closed. To obtain the fourth forward gear G4, the first shifting element A, the fourth shifting element D and the sixth shifting element F are closed. In the fifth forward gear G5 the first shifting element A, the third shifting element C and the sixth shifting element F are closed. In the sixth forward gear G6 the first shifting element A, the second shifting element B and the sixth shifting element F are closed. To obtain the seventh forward gear G7, the first shifting element A, the second shifting element B and the third shifting element C are closed. To obtain the eighth forward gear G8 the second shifting element B, the third shifting element C and the sixth shifting element F are closed. For the ninth forward gear G9 the second shifting element B, the fourth shifting element D and the sixth shifting element F are closed. For the reverse gear R the third shifting element C, the fifth shifting element E and the sixth shifting element F are closed. In the additional gear Z, the first shifting element A, the second shifting element B and the fourth shifting element D are closed.

INDEXES

1 First shaft, drive input shaft
2 Second shaft, drive output shaft
3 Third shaft
4 Fourth shaft
5 Fifth shaft
6 Sixth shaft
7 Seventh shaft
8, 8A, 8B, 8C, 8D Eighth shaft
9 Housing
A First shifting element
B Second shifting element
C Third shifting element
D Fourth shifting element
E Fifth shifting element
F Sixth shifting element
RS1 First planetary gearset
RS2 Second planetary gearset
RS3 Third planetary gearset
RS4 Fourth planetary gearset
SO1 Sun gear of the first planetary gearset
PT1 Planetary carrier of the first planetary gearset
HO1 Ring gear of the first planetary gearset
SO2 Sun gear of the second planetary gearset
PT2 Planetary carrier of the second planetary gearset
HO2 Ring gear of the second planetary gearset
SO3 Sun gear of the third planetary gearset
PT3 Planetary carrier of the third planetary gearset
HO3 Ring gear of the third planetary gearset
SO4 Sun gear of the fourth planetary gearset
PT4 Planetary carrier of the fourth planetary gearset
HO4 Ring gear of the fourth planetary gearset
G1 First forward gear
G2 Second forward gear
G3 Third forward gear
G4 Fourth forward gear
G5 Fifth forward gear
G6 Sixth forward gear
G7 Seventh forward gear
G8 Eighth forward gear
G9 Ninth forward gear
R Reverse gear
Z Additional gear
1. First alternative arrangement position for the first shifting element
2. Second alternative arrangement position for the first shifting element
3. Third alternative arrangement position for the first shifting element
4. Fourth alternative arrangement position for the first shifting element
i Transmission ratio
$i_0$ Fixed transmission ratio of a planetary gearset
φ Gear interval

The invention claimed is:
1. A multi-gear transmission of a planetary design for a vehicle, the transmission comprising:
first, second, third and fourth planetary gearsets (RS1, RS2, RS3, RS4) arranged in a housing (9), and each of the first, the second, the third and the fourth planetary gearsets comprising a sun gear, a ring gear and a planetary carrier;

a plurality of shafts (1, 2, 3, 4, 5, 6, 7, 8, 8A, 8B, 8C, 8D) arranged within the housing (9);

first, second, third, fourth, fifth and sixth shifting elements (A, B, C, D, E, F) arranged in the housing (9), and selective actuation of the first, the second, the third, the fourth, the fifth and the sixth shifting elements facilitates implementing a plurality of gears;

a first shaft (1) being a drive input (An) which is either directly connected or indirectly connected to the sun gear (SO3) of the third planetary gearset (RS3), the first shaft (1) being indirectly connected to the sun gear (SO1) of the first planetary gearset (RS1), and the first shaft (1) being indirectly connected to both the planetary carrier (PT1) of the first planetary gearset (RS1) and the planetary carrier (PT2) of the second planetary gearset (RS2);

a second shaft (2) being a drive output (Ab) which is directly connected to the ring gear (HO4) of the fourth planetary gearset (RS4) and the second shaft (2) being either directly connected or indirectly connected to the planetary carrier (PT3) of the third planetary gearset (RS3);

the sun gear (SO1) and the planetary carrier (PT1) of the first planetary gearset (RS1) and the sun gear (SO4) of the fourth planetary gearset (RS4) are each connectable to the housing (9);

the ring gear (HO1) of the first planetary gearset (RS1) being connected to the planetary carrier (PT4) of the fourth planetary gearset (RS4) and being either connectable or connected to the sun gear (SO2) of the second planetary gearset (RS2); and the ring gear (HO2) of the second planetary gearset (RS2) and the ring gear (HO3) of the third planetary gearset (RS3) being either connected or connectable to one another.

2. The multi-gear transmission according to claim 1, wherein the first, the second and the third shifting elements (A, B, C) are clutches and the fourth, the fifth and the sixth shifting elements (D, E, F) are brakes;

the first shaft (1) is connectable, via the first shifting element (A) and an eighth shaft (8), to the sun gear (SO3) of the third planetary gearset (RS3), the first shaft (1) is connectable, via the second shifting element (B) and a third shaft (3), to the planetary carrier (PT1) of the first planetary gearset (RS1) and to the planetary carrier (PT2) of the second planetary gearset (RS2);

the planetary carrier (PT1) of the first planetary gearset (RS1) is connectable, via the third shaft (3) and a fifth shifting element (E), to the housing (9), the first shaft (1) is connectable, via the third shifting element (C) and a fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to the ring gear (HO4) of the fourth planetary gearset (RS4) and to the planetary carrier (PT3) of the third planetary gearset (RS3);

the ring gear (HO1) of the first planetary gearset (RS1) is connected, via a seventh shaft (7), to the sun gear (SO2) of the second planetary gearset (RS2) and to the planetary carrier (PT4) of the fourth planetary gearset (RS4);

the ring gear (HO2) of the second planetary gearset (RS2) is connected, via a sixth shaft (6), to the ring gear (HO3) of the third planetary gearset (RS3); and the sun gear (SO4) of the fourth planetary gearset (RS4) is connectable, via a fifth shaft (5) and the sixth shifting element (F), to the housing (9).

3. The multi-gear transmission according to claim 1, wherein the first, the second and the third shifting elements (A, B, C) are clutches and the fourth, the fifth and the sixth shifting elements (D, E, F) are brakes;

the first shaft (1) is connected to the sun gear (SO3) of the third planetary gearset (RS3);

the first shaft (1) is also connectable, via the second shifting element (B) and a third shaft (3), to the planetary carrier (PT1) of the first planetary gearset (RS1) and to the planetary carrier (PT2) of the second planetary gearset (RS2);

the planetary carrier (PT1) of the first planetary gearset (RS1) is connectable, via the third shaft (3) and the fifth shifting element (E), to the housing (9);

the first shaft (1) is connectable, via the third shifting element (C) and a fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to the ring gear (HO4) of the fourth planetary gearset (RS4), and the second shaft (2) is connectable, via the first shifting element (A) and an eighth shaft (8A), to the planetary carrier (PT3) of the third planetary gearset (RS3);

the ring gear (HO1) of the first planetary gearset (RS1) is connected, via a seventh shaft (7), to the sun gear (SO2) of the second planetary gearset (RS2) and to the planetary carrier (PT4) of the fourth planetary gearset (RS4);

the ring gear (HO2) of the second planetary gearset (RS2) is connected, via a sixth shaft (6), to the ring gear (HO3) of the third planetary gearset (RS3); and the sun gear (SO4) of the fourth planetary gearset (RS4) is connectable, via a fifth shaft (5) and the sixth shifting element (F), to the housing (9).

4. The multi-gear transmission according to claim 1, wherein the first, the second and the third shifting elements (A, B, C) are clutches and the fourth, the fifth and the sixth shifting elements (D, E, F) are brakes;

the first shaft (1) is connected to the sun gear (SO3) of the third planetary gearset (RS3), the first shaft (1) is also connectable, via the second shifting element (B) and a third shaft (3), to both the planetary carrier (PT1) of the first planetary gearset (RS1) and the planetary carrier (PT2) of the second planetary gearset (RS2);

the planetary carrier (PT1) of the first planetary gearset (RS1) is connectable, via the third shaft (3) and the fifth shifting element (E), to the housing (9);

the first shaft (1) is connectable, via the third shifting element (C) and a fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to both the ring gear (SO4) of the fourth planetary gearset (RS4) and the planetary carrier (PT3) of the third planetary gearset (RS3);

the ring gear (HO1) of the first planetary gearset (RS1) is connected, via a seventh shaft (7), to both the sun gear (SO2) of the second planetary gearset (RS2) and the planetary carrier (PT4) of the fourth planetary gearset (RS4);

the ring gear (HO2) of the second planetary gearset (RS2) is connectable, via a sixth shaft (6) and the first shifting element (A) and an eighth shaft (8B), to the ring gear (HO3) of the third planetary gearset (RS3); and the sun gear (SO4) of the fourth planetary gearset (RS4) is connectable, via a fifth shaft (5) and the sixth shifting element (F), to the housing (9).

5. The multi-gear transmission according to claim 1, wherein the first, the second and the third shifting elements (A, B, C) are clutches and the fourth, the fifth and the sixth fifth shifting elements (D, E, F) are brakes;

the first shaft (1) is connected to the sun gear (SO3) of the third planetary gearset (RS3), the first shaft (1) is also connectable, via the second shifting element (B) and a third shaft (3), to the planetary carrier (PT1) of the first planetary gearset (RS1);

the planetary carrier (PT1) of the first planetary gearset (RS1) is connectable, via the third shaft (3) and the fifth shifting element (E), to the housing (9);

the planetary carrier (PT2) of the second planetary gearset (RS2) is connectable, via the third shaft (3) and the first shifting element (A) and an eighth shaft (8C), to both the first shaft (1) and the planetary carrier (PT1) of the first planetary gearset (RS1);

the first shaft (1) is connectable, via the third shifting element (C) and a fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to both the ring gear (HO4) of the fourth planetary gearset (RS4) and the planetary carrier (PT3) of the third planetary gearset (RS3):

the ring gear (HO1) of the first planetary gearset (RS1) is connected, by a seventh shaft (7), to both the sun gear (SO2) of the second planetary gearset (RS2) and the planetary carrier (PT4) of the fourth planetary gearset (RS4);

the ring gear (HO2) of the second planetary gearset (RS2) is connected by a sixth shaft (6) to the ring gear (HO3) of the third planetary gearset (RS3); and the sun gear (SO4) of the fourth planetary gearset (RS4) is connectable, via a fifth shaft (5) and the sixth shifting element (F), to the housing (9).

6. The multi-gear transmission according to claim 1, wherein the first, the second and the third shifting elements (A, B, C) are clutches and the fourth, the fifth and the sixth shifting elements (D, E, F) are brakes;

the first shaft (1) is connected to the sun gear (SO3) of the third planetary gearset (RS3);

the first shaft (1) is connectable, via the second shifting element (B) and a third shaft (3), to both the planetary carrier (PT1) of the first planetary gearset (RS1) and the planetary carrier (PT2) of the second planetary gearset (RS2);

the planetary carrier (PT1) of the first planetary gearset (RS1) is connectable, via the third shaft (3) and the fifth shifting element (E), to the housing (9);

the first shaft (1) is also connectable, via the third shifting element (C) and a fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to both the ring gear (HO4) of the fourth planetary gearset (RS4) and the planetary carrier (PT3) of the third planetary gearset (RS3);

the ring gear (HO1) of the first planetary gearset (RS1) is connected by a seventh shaft (7) to the planetary carrier (PT4) of the fourth planetary gearset (RS4) and the seventh shaft (7) is connectable, via the first shifting element (A) and an eighth shaft (8D), to the sun gear (SO2) of the second planetary gearset (RS2);

the ring gear (HO2) of the second planetary gearset (RS2) is connected by a sixth shaft (6) to the ring gear (HO3) of the third planetary gearset (RS3), and the sun gear (SO4) of the fourth planetary gearset (RS4) is connectable, via a fifth shaft (5) and the sixth shifting element (F), to the housing (9).

7. The multi-gear transmission according to claim 1, wherein at least nine forward gears (G1, G2, G3, G4, G5, G6, G7, G8, G9, Z) and at least one reverse gear (R) can be implemented, and each of the at least nine forward gears and the at least one reverse gear (R) is implemented by engagement of at least three of the first, the second, the third, the fourth, the fifth and the sixth shifting elements (A, B, C, D, E, F).

8. The multi-gear transmission according to claim 1, wherein the first planetary gearset (RS1), the third planetary gearset (RS3) and the fourth planetary gearset (RS4) are minus planetary gearsets and the second planetary gearset (RS2) is a plus planetary gearset.

9. The multi-gear transmission according to claim 1, wherein a first gear (G1) is implemented by engagement of the first (A), the third (C) and the fifth (E) shifting elements, a second gear (G2) is implemented by engagement of the first (A), the fourth (D) and the fifth (E) shifting elements, a third gear (G3) is implemented by engagement of the first (A), the fifth (E) and the sixth (F) shifting elements, a fourth gear (G4) is implemented by engagement of the first (A), the fourth (D) and the sixth (F) shifting elements, a fifth gear (G5) is implemented by engagement of the first (A), the third (C) and the sixth (F) shifting elements, a sixth gear (G6) is implemented by engagement of the first (A), the second (B) and the sixth (F) shifting elements, a seventh gear (G7) is implemented by engagement of the first (A), the second (B) and the third (C) shifting elements, an eighth gear (G8) is implemented by engagement of the sixth (F), the second (B) and the third (C) shifting elements, a ninth gear (G9) is implemented by engagement of the second (B), the fourth (D) and the sixth (F) shifting elements, a reverse gear (R) is implemented by engagement of the third (C), the fifth (E) and the sixth (F) shifting elements, an alternative forward gear (Z) is implemented by engagement of the first (A), the second (B) and the fourth (D) shifting elements.

10. The multi-gear transmission according to claim 1, wherein the planetary carrier (PT1) of the first planetary gearset (RS1) and the planetary carrier (PT2) of the second planetary gearset (RS2) are either directly connected or directly connectable with one another.

11. The multi-gear transmission according to claim 1, wherein the first shifting element (A), the second shifting element (B) and the third shifting element (C) are clutches, and the fourth shifting element (D), the fifth shifting element (E) and the sixth shifting element (F) are brakes.

12. The multi-gear transmission according to claim 11, wherein at least one of the first shifting element (A) and the fifth shifting element (E) are interlocking shifting elements.

13. A multi-gear transmission of a planetary design for a vehicle, the transmission comprising:
    first, second, third and fourth planetary gearsets (RS1, RS2, RS3, RS4) arranged in a housing (9), and each of the first, the second, the third and the fourth planetary gearsets comprising a sun gear, a ring gear and a planetary carrier;
    a drive input shaft, a drive output shaft, third, fourth, fifth, sixth, seventh and eighth shafts (1, 2, 3, 4, 5, 6, 7, 8, 8A, 8B, 8C, 8D) arranged in the housing (9);
    first, second, third, fourth, fifth and sixth shifting elements (A, B, C, D, E, F) arranged in the housing (9) so that selective actuation of the first, the second, the third, the fourth, the fifth and the sixth shifting elements facilitates implementation of a plurality of gears;
    the drive input shaft (An) being either continuously connected or being connectable to the sun gear (SO3) of the third planetary gearset (RS3);
    the drive input shaft (An) being selectively connectable to each of:
        the sun gear (SO1) of the first planetary gearset (RS1),
        the planetary carrier (PT1) of the first planetary gearset (RS1), and
        the planetary carrier (PT2) of the second planetary gearset (RS2);
    the drive output shaft (Ab) being continuously connected to the ring gear (HO4) of the fourth planetary gearset (RS4) and the drive output shaft (Ab) being connectable to the planetary carrier (PT3) of the third planetary gearset (RS3);
    the sun gear (SO1), the planetary carrier (PT1) of the first planetary gearset (RS1) and the sun gear (SO4) of the fourth planetary gearset (RS4) each being connectable to the housing (9);
    the ring gear (HO1) of the first planetary gearset (RS1) being continuously connected to the planetary carrier (PT4) of the fourth planetary gearset (RS4) and the ring gear (HO1) of the first planetary gearset (RS1) being connectable to the sun gear (SO2) of the second planetary gearset (RS2); and
    the ring gear (HO2) of the second planetary gearset (RS2) being connectable to the ring gear (HO3) of the third planetary gearset (RS3).

14. The multi-gear transmission according to claim 13, wherein at least nine forward gears (G1, G2, G3, G4, G5, G6, G7, G8, G9, Z) and at least one reverse gear (R) can be implemented, and each of the at least nine forward gears and the at least one reverse gear is implemented by engagement of at least three of the first, the second, the third, the fourth, the fifth and the sixth shifting elements (A, B, C, D, E, F).

15. The multi-gear transmission according to claim 13, wherein the first shifting element (A), the second shifting element (B) and the third shifting element (C) are clutches, and the fourth shifting element (D), the fifth shifting element (E) and the sixth shifting element (F) are brakes.

16. The multi-gear transmission according to claim 13, wherein the first planetary gearset (RS1), the third planetary gearset (RS3) and the fourth planetary gearset (RS4) are minus planetary gearsets and the second planetary gearset (RS2) is a plus planetary gearset.

17. The multi-gear transmission according to claim 13, wherein a first gear (G1) is implemented by engagement of the first (A), the third (C) and the fifth (E) shifting elements,
    a second gear (G2) is implemented by engagement of the first (A), the fourth (D) and the fifth (E) shifting elements,
    a third gear (G3) is implemented by engagement of the first (A), the fifth (E) and the sixth (F) shifting elements,
    a fourth gear (G4) is implemented by engagement of the first (A), the fourth (D) and the sixth (F) shifting elements,
    a fifth gear (G5) is implemented by engagement of the first (A), the third (C) and the sixth (F) shifting elements,
    a sixth gear (G6) is implemented by engagement of the first (A), the second (B) and the sixth (F) shifting elements,
    a seventh gear (G7) is implemented by engagement of the first (A), the second (B) and the third (C) shifting elements,
    an eighth gear (G8) is implemented by engagement of the sixth (F), the second (B) and the third (C) shifting elements,
    a ninth gear (G9) is implemented by engagement of the second (B), the fourth (D) and the sixth (F) shifting elements,
    a reverse gear (R) is implemented by engagement of the third (C), the fifth (E) and the sixth (F) shifting elements,
    an alternative forward gear (Z) is implemented by engagement of the first (A), the second (B) and the fourth (D) shifting elements.

* * * * *